Sept. 2, 1930.    J. T. ELLIS    1,774,967
PISTON FOR SLUSH PUMPS
Filed Aug. 3, 1929
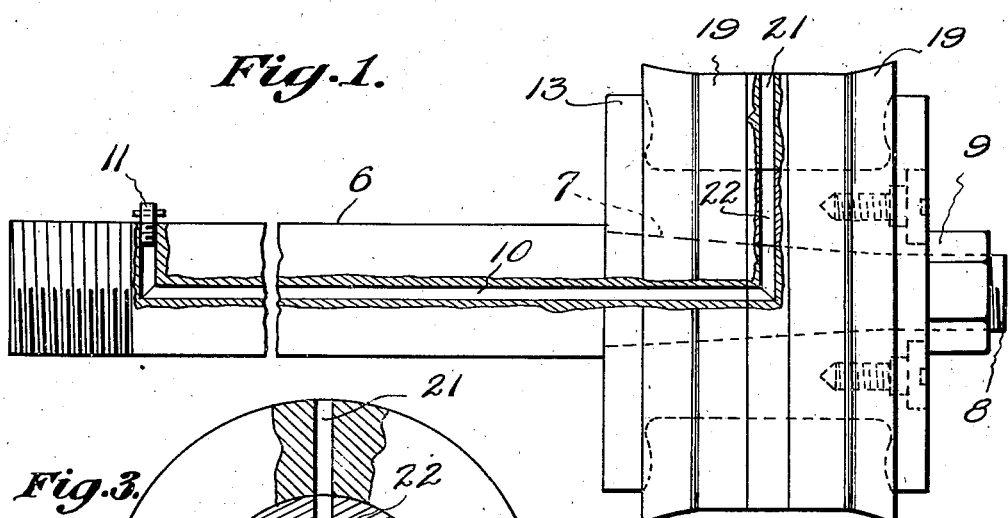
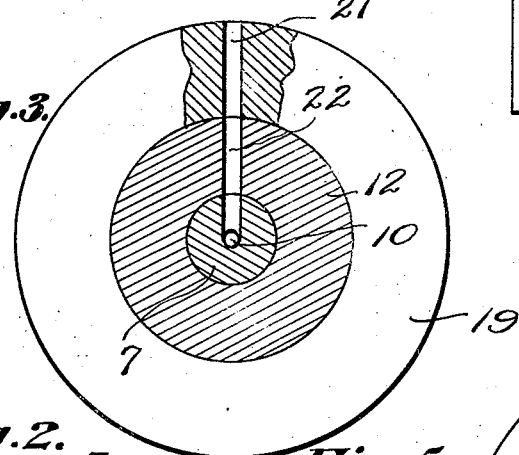
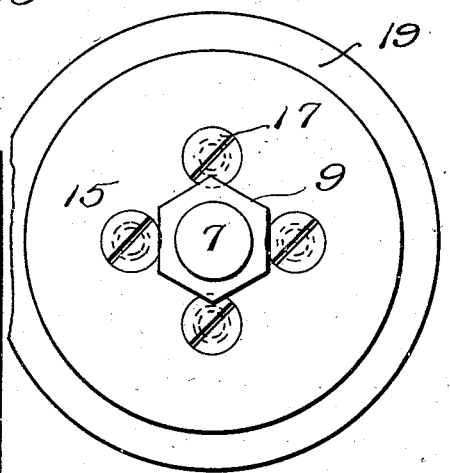
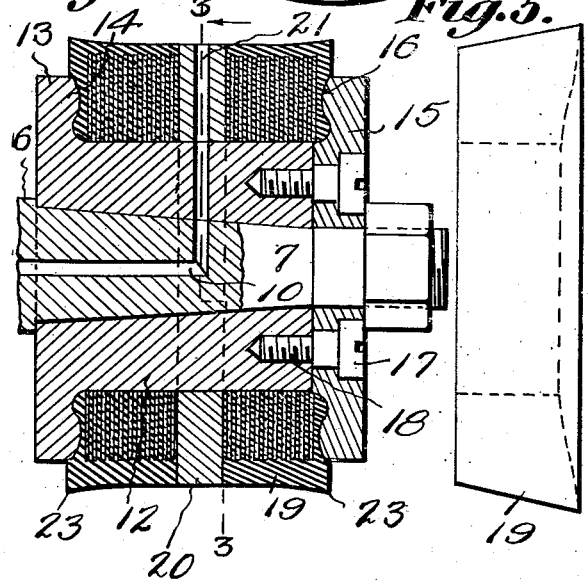
INVENTOR.
J. T. Ellis,
BY
Bernard F. Garvey
ATTORNEY.

Patented Sept. 2, 1930

1,774,967

UNITED STATES PATENT OFFICE

JAMES T. ELLIS, OF SULPHUR, LOUISIANA

PISTON FOR SLUSH PUMPS

Application filed August 3, 1929. Serial No. 383,393.

The present invention consists of a slush pump piston especially adapted for use in rotary drills customarily used in well drilling.

An object of the invention is to provide a piston assembly which will effectively operate to carry the slush on both strokes of the piston with a minimum of resistance and wear to provide a more effective pump and one more effective in operation.

Another object of the invention is to provide a multi-part head to permit adjustment and replacement, when necessary, of the wear take up parts of the piston.

A further object of the invention is to make the wear take up parts of the piston of rubber and fabric to produce a fibrous body resistant to abrasives and other disintegrating elements which inhere in the slush.

Other objects of the invention will be apparent from the following description of the present preferred form of the invention, taken in connection with the accompanying drawings, wherein Fig. 1 is a side elevational view, partly in section of a piston constructed in accordance with the present invention showing the same applied to a piston rod and illustrating to advantage the lubricant way through the piston rod and piston body.

Fig. 2 is a detail fragmentary sectional view taken through the piston body;

Fig. 3 is a sectional view taken on the line 3—3 of Fig. 2 looking in the direction of the arrow;

Fig. 4 is an end elevational view of piston as applied to the piston rod; and

Fig. 5 is a side elevational view of one of the piston cups.

The device of the present invention embodies a piston rod or shaft 6 which may be of any desired conformation and in the present instance is shown to be circular in cross section and having the piston body receiving end thereof 7 tapered. The free terminal of the tapered end is provided with screw threads 8 adapted for the reception of a nut 9 in a manner hereinafter set forth. The piston is provided with an axial bore 10 which provides a lubricant way, on end of which turns at right angles and opens through the periphery of the rod, being equipped with a fitting 11 through which the lubricant is introduced. The opposite end of the lubricant way terminates approximately midway the ends of the reduced portion of the piston rod and opens out through the periphery of said reduced end of the piston, for the purpose hereinafter set forth.

The piston body constructed in accordance with the present invention consists of a head 12 made of steel or other suitable metal, the inner end of which is enlarged to provide a discal terminal 13 which is provided on the inner-face thereof with an annual boss 14. The outer end of the head is detachable to provide a follower 15, which is similar in conformation to the discal end 13 and is provided with an annular boss 16 which is arranged in parallelism to the boss 14. The follower end 15 of the piston head is provided with a series of openings which are adapted for the reception of countersunk bolts 17. Each of the bolts is provided with a threaded shank 18 which is adapted for engagement with a complemental recess formed in the piston head 12. The head of each of the bolts 17 is provided with a kerf to permit the bolts to be engaged or disengaged through the medium of a screw driver or like instrument.

The piston head further includes yieldable cup elements generally designated 19 each of which is composed of laminated sheets of rubber and fabric which are preferably vulcanized together to provide an integral cup, the outer periphery of each of which is smooth. In the present instance, two cups are shown which are identical in contour and are mounted on the periphery of the head 12 having a slip ring 20 interposed therebetween. The ring 20 is provided with a radial opening 21 which forms a lubricant way which communicates with a way 22 formed radially in the head 12, and in communication with the lubricant way 10 of the piston rod 6. Consequently lubricant introduced through the fitting 11 is permitted to pass through the way 10 and ultimately out through the periphery of the slit ring 10 for impingement against the periphery of the piston body and cylinder wall. The cups 19 are provided with recesses in the outer faces which complement the bosses 14 and 16 of the piston head to positively retain the cups from displacement when the follower end 15 is snugly engaged with the body of the head 12. It will be noted that the opposite extremities of the cups 19 are flared outwardly to provide lips 23 for liquid tight engagement with the cylinder wall to carry slush on both strokes of the piston.

It has been found that the provision of a piston head made of steel or like metal, engaged with the piston rod as herein set out provides a durable structure effective in operation when used with a cylinder engaging body having adequate resiliency or flexibility to prevent disintegration prematurely under the influence of abrasives which inhere in slush. It has been found that the vulcanized cups herein illustrated when used in accordance with the teaching of the present invention provide ample flexibility, are effectively lubricated to reduce friction and are formed to carry slush on both piston strokes and greatly increase the life of the piston. It is, of course, to be understood that the cups may be expeditiously replaced by removing follower end 15 of the piston head in a manifest manner. The entire piston assembly is positively held from displacement on the piston rod by the nut 9 which, as is apparent, must first be removed before the follower end 15 is disengaged.

It is, of course, to be understood that although I have described the invention as being especially adapted for use in slush pumps I am nevertheless aware that a device of this invention is susceptible of other uses and that changes may be made therein within the scope of the claims hereto appended.

What is claimed is:—

1. A slush pump piston including a piston rod equipped with a head having discal ends, a pair of cups, mounted on the head between said ends, said cups being of truncated cone shape and having their smaller ends arranged in proximity, and a slip ring mounted on said head between the smaller ends of the cups, the diameter of the ring complementing the diameters of said reduced ends of the cups.

2. In a slush pump piston including a piston rod and head, the latter being provided with an annular recess, yielding cups mounted in said recess, said cups being of truncated cone shape with their smaller ends arranged in proximity, a non-yieldable ring interposed between the proximate ends of said cups and extending from the head to the peripheral wall of the cups.

JAMES T. ELLIS.